United States Patent Office 3,142,672
Patented July 28, 1964

3,142,672
DERIVATIVES OF N-α-PHENYL- AND N-α-BIPHENYLYLBUTYRIC ACIDS AND AMINO SUGARS
Katsutada Masuda, Ashiya, Japan, assignor to Takeda Pharmaceutical Industries, Ltd., Higashi-ku, Osaka, Japan
No Drawing. Original application Sept. 3, 1957, Ser. No. 681,470. Divided and this application Oct. 12, 1960, Ser. No. 66,394
Claims priority, application Japan Sept. 5, 1956
3 Claims. (Cl. 260—211)

The present invention relates to new compounds which are, more particularly, useful in the prevention and alleviation of degenerations which are more commonly associated with old age. They are therefore useful in therapy.

This application is a division of application Serial No. 681,470, filed September 3, 1957, now abandoned.

The said new compounds are representable by the formula

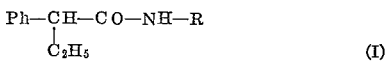
(I)

wherein Ph stands for the phenyl or biphenylyl radical, and —NH—R is the residue of an amino sugar.

Degenerative conditions which are generally bound up with old age are, for example, arteriosclerosis and hypertension; liver function troubles, such as cirrhosis of the liver, are also known as conditions from which the aged organism is prone to suffer. Of late, studies have been made on compounds which are effective for the prevention and treatment of these degenerations. Among these compounds, phenyl or biphenylylbutyric acid and the salts thereof have been reported as being active in lowering the cholestrol content of the blood. For example, J. Redel, J. Cotte and A. Mathivat have reported in detail on α-phenylbutyric acid (Compt. rend., 236, 2553 (1953); La Presse medical, 62, 939 (1954)), and G. Annoni, S. Garattini, C. Morpurgo, N. Passerini, P. A. Tavormina and M. Gibbo have reported on α-biphenylylbutyric acid (Farmaco sci. e tec (Pavia) 11, 244 (1956); Experientia, 12, 347 (1956); J. Am. Chem. Soc., 79, 758 (1957)).

A primary object of the present invention is the embodiment of a new group of compounds which, due to their activity in normalizing lipoidal metabolism by their action in lowering the blood cholestrol content and in protecting liver function, are useful in the treatment of degenerations such as atherosclerosis, liver cirrhoisis, etc.

This object is realized by the present invention according to which new compounds (I) having the desired activity are prepared by reacting α-phenylbutyric acid or α-diphenylylbutyric acid with an amino sugar.

Various amino sugars may be combined with the α-phenyl- or α-biphenylylbutyric acid for the production of the new compounds. Representative of the amino sugars which may be employed are the amino sugars are glucosamine, chondrosamine and the like. Active compounds which can thus be prepared comprise, for example, N-α-phenylbutyroyl-d-glucosamine, etc. These compounds, in addition to their action in reducing the total serum cholesterol level in the blood are characterized by very good tolerability (very low toxicity) so that the administration thereof—for example, perorally—presents no problem.

All the compounds (I) of the present invention are formed by the combination of α-phenylbutyric acid or α-biphenylylbutyric acid with amino sugars, employing the methods generally used for the production of acid amides. For example, the α-phenylbutyric acid or α-biphenylylbutyric acid is converted into a reactive derivative, which is then reacted with an amino sugar. Reactive derivatives are for example the acid halides, acid anhydrides or esters. The reaction between these reactive derivatives and the amino sugars is generally effected in an aqueous solvent in the presence of a suitable deacidating agent. As deacidating agent, there is advantageously employed an inorganic basic reagent such as the hydroxide or carbonate of alkali metals and alkali earth metals. Instead of the active derivatives of α-phenyl (or biphenylyl) butyric acid, the free acid or its salts of alkali metals, for example, may be used, and in that case they are generally reacted with amino sugars in a suitable solvent in the presence of a suitable catalyst. As the solvent, benzene, toluene, or tetrahydrofurane may, for example, be employed. In short, the reaction in the method of the present invention is effected by reacting α-phenyl (or biphenylyl) butyric acid or its active derivatives with amino sugars.

Following are representative examples of the method of the present invention, but they do not limit the scope of the present invention. The disclosures mentioned above, descriptions in the following claims, and modifications therefrom are all involved in the range of the present invention.

The "parts" in the examples are all by weight and the temperatures are uncorrected.

Example 1

To a solution of 11 parts of d-glucosamine hydrochloride in 20 parts of 5 N-NaOH solution is added 9 parts of α-phenylbutyroyl chloride under agitation with cooling. The reaction mixture becomes clear gradually, and a white oily or semi-solid product is formed, which solidifies later. The product is recrystallized from 90% alcohol to obtain 12 parts of N-α-phenylbutyroyl-d-glucosamine, M.P. 172° C., in white needles.

Analysis.—Calcd. for $C_{16}H_{23}O_6N.H_2O$: C, 56.00%, H, 7.30%, N, 4.10%. Found: C, 56.45%, H, 7.38%, N, 3.86%.

Example 2

To a solution of 4.2 parts of d-glucosamine in 5 parts of 5 N-NaOH solution is added dropwise 70 parts of an ethereal solution of 5 parts of p-biphenylylbutroyl chloride. Simultaneously 5 parts of 5 N-NaOH is also added to keep the mixture alkaline. After agitation of the solution for 8 hours, the ethereal layer is separated and the solid substance formed in the aqueous layer is filtered up. Recrystallization of the product from 99% ethanol gives 2.5 parts of N-α-p-biphenylylbutyroyl-d-glucosamine, M.P. 187° C., in colorless small needles.

Analysis.—Calcd. for $C_{22}H_{27}O_6N.H_2O$: C, 62.99%, H, 6.97%, N, 3.34%. Found: C, 62.81%, H, 6.91%, N, 3.42%.

Having thus disclosed the invention, what is claimed is:
1. A compound having the formula

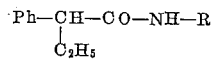

wherein Ph is a member selected from the group consisting of phenyl and biphenylyl, and —NH—R is an amino sugar residue selected from the group consisting of D-glucosamino and chondrosamino.
2. N-α-phenylbutyroyl-d-glucosamine.
3. N-α-biphenylylbutyroyl-d-glucosamine.

References Cited in the file of this patent
UNITED STATES PATENTS 2,463,885     Kuehl ------------------ Mar. 8, 1949

OTHER REFERENCES

Compt. rend 236 (1953), page 2553.
Cottel et al.: La Presse Medicole 62 (1954), pages 939–941.